United States Patent
Aitken et al.

(10) Patent No.: US 10,519,061 B2
(45) Date of Patent: Dec. 31, 2019

(54) USE OF ARSENIC-FREE CHALCOGENIDE GLASSES FOR HOT-MELT PROCESSING

(71) Applicant: Corning Incorporated, Corning, NY (US)

(72) Inventors: Bruce Gardiner Aitken, Corning, NY (US); Stephen Charles Currie, Corning, NY (US)

(73) Assignee: Corning Incorporated, Corning, NY (US)

(*) Notice: Subject to any disclaimer, the term of this patent is extended or adjusted under 35 U.S.C. 154(b) by 209 days.

(21) Appl. No.: 15/643,831

(22) Filed: Jul. 7, 2017

(65) Prior Publication Data

US 2018/0016186 A1 Jan. 18, 2018

Related U.S. Application Data

(60) Provisional application No. 62/363,570, filed on Jul. 18, 2016.

(51) Int. Cl.
   *C03C 3/32* (2006.01)
   *C03B 19/02* (2006.01)

(52) U.S. Cl.
   CPC ............ *C03C 3/321* (2013.01); *C03B 19/025* (2013.01); *C03B 2201/86* (2013.01)

(58) Field of Classification Search
   CPC .................................................. C03C 3/321
   See application file for complete search history.

(56) References Cited

U.S. PATENT DOCUMENTS

| 4,730,896 A | 3/1988 | Katsuyama et al. |
| 5,346,523 A | 9/1994 | Sugai et al. |
| 7,116,888 B1* | 10/2006 | Aitken .................... C03C 3/321 385/147 |
| 7,330,634 B2 | 2/2008 | Aitken et al. |
| 7,767,604 B2* | 8/2010 | Aitken ...................... C03C 4/10 385/147 |

(Continued)

FOREIGN PATENT DOCUMENTS

| EP | 0940373 A2 | 9/1999 |
| JP | 06211540 A | 8/1994 |

(Continued)

OTHER PUBLICATIONS

Savage, J.A., Webber, P.J., Pitt, A.M., "An assessment of Ge—Sb—Se glasses as 8 to 12 um infra-red optical materials", Journal of Materials Science 13 (1978) 859-864 (Year: 1978).*

(Continued)

*Primary Examiner* — Jason L Lazorcik
(74) *Attorney, Agent, or Firm* — Kevin L. Bray

(57) ABSTRACT

Disclosed herein are methods for producing glass articles by hot-melt processing techniques. The methods involve the use of arsenic-free chalcogenide glasses. Despite the absence of arsenic, the chalcogenide glasses have low characteristic temperatures and are stable against crystallization. The low characteristic temperatures render the glasses capable of being hot-melt processed using conventional equipment. The glasses disclosed herein are suitable for the fabrication of optical devices, including but not limited to IR-transmitting optical devices.

17 Claims, 3 Drawing Sheets

(56) References Cited

U.S. PATENT DOCUMENTS

| | | | |
|---|---|---|---|
| 8,603,928 B2* | 12/2013 | Tani | C03C 3/321 |
| | | | 501/40 |
| 2003/0007203 A1* | 1/2003 | Amon | C03B 19/02 |
| | | | 359/19 |
| 2004/0079114 A1* | 4/2004 | Aitken | C03B 11/082 |
| | | | 65/64 |
| 2004/0206119 A1 | 10/2004 | Syllaios et al. | |
| 2004/0206121 A1* | 10/2004 | Autery | C03B 5/02 |
| | | | 65/83 |
| 2004/0206122 A1* | 10/2004 | Autery | C03B 11/08 |
| | | | 65/83 |
| 2008/0269044 A1 | 10/2008 | Zhao et al. | |
| 2012/0321263 A1 | 12/2012 | Gibson et al. | |
| 2017/0057856 A1* | 3/2017 | Ashida | C03B 11/122 |

FOREIGN PATENT DOCUMENTS

| | | |
|---|---|---|
| JP | 10101362 A | 4/1998 |
| JP | 2006076845 A | 3/2006 |
| JP | 2006220705 A | 8/2006 |
| WO | 2016052159 A1 | 4/2016 |

OTHER PUBLICATIONS

International Search Report and Written Opinion PCT/US2017/042087 dated Sep. 26, 2017.

\* cited by examiner

USE OF ARSENIC-FREE CHALCOGENIDE GLASSES FOR HOT-MELT PROCESSING

This application claims the benefit of priority under 35 U.S.C. § 119 of U.S. Provisional Application Ser. No. 62/363,570 filed on Jul. 18, 2016 the content of which is relied upon and incorporated herein by reference in its entirety.

BACKGROUND

The efficient, low cost, and low temperature processes used to make a variety of plastic articles have allowed organic polymer materials to replace glass in many technological applications. Cost aside, glass articles are preferred in most instances due to their superior physical properties. If it were possible to manufacture glass lenses or other parts by a low-cost process such as injection molding, such lenses and other parts would be competitive with their plastic counterparts.

Optical elements have various uses in many diverse technologies, including sensors, image projectors, displays (e.g., liquid crystal displays (LCDs), plasma display, and electro-luminescence display), as well as opto-electronic devices for telecommunications. As the telecommunications industry itself develops the need to develop precision optical elements that incorporate microstructures increases. In telecommunication devices, optical elements may be used, for example, in fiber and laser couplers, optical switches, or as diffraction gratings for WDM applications, and densely packed microlens arrays (MLAs) or networks for wavelength management modules or collimator applications. Precision optical elements require highly polished surfaces or exacting surface figures or qualities. The surfaces demand fabrication in proper geometric relationship to each other, and, where the elements are to be used in transmission applications, they will be prepared from a material of controlled, uniform, and isotropic refractive index.

Numerous methods and materials may be used to fabricate complex, precision optical elements. However, a great majority of conventional machining processes for manufacturing optical components are unsuited for producing very small features. Components having surface features or dimensions of 500 microns or smaller typically can be fabricated only through a few methods of limited applicability. The fabrication of microstructured surfaces using polymers is derived from processes developed by the semiconductor industry for making integrated circuits. For example, photolithography and ion etching techniques can be used to create structures having sub-millimeter surface features. However, these methods are not suitable for large-scale manufacturing. The process time required to etch a microstructure is proportionally dependent on the total depth of the microstructure. Moreover, not only are such methods expensive, but they can produce only a limited range of feature types. Etching processes are particularly worrisome because they can create rough surfaces. As a result, a smooth concave or convex profile, or true prismatic profiles, cannot be readily achieved using either of the two foregoing techniques.

Molding or hot embossing of plastics or glass materials, on the other hand, can form micron to sub-micron sized features. Plastics can conform to molds and reproduce faithfully intricate designs or fine microstructures. Unfortunately for many telecommunications applications, plastic materials are not ideal since they suffer from numerous shortcomings. For example, plastic materials have limited mechanical properties; are often not sufficiently robust to withstand, over time, environmental degradation; they exhibit large coefficients of thermal expansion (which can result in changes in volume and index of refraction); and it has been found that plastic optical devices often cannot withstand long exposure to humidity or high temperatures—all of which thereby limit the temperature range over which plastic optical devices may be useful.

Plastic materials also do not have complete transparency in the infrared (IR). As a result, one cannot use plastic materials to form a lens or other optical device in the IR range where the plastic absorbs. Further, plastics cannot transmit high-power light due to the internal heating of the material that will cause a plastic component's surface features to degrade and its index of refraction to change—both of which are unacceptable in an optical context. In addition, since plastic materials for optical applications are available in only a limited range of dispersion and refractive indices, plastics can provide only a restricted transmission range. As a result, the usefulness of plastic materials, even within the restricted telecommunications bandwidth, is limited by the tendency to accumulate internal stresses; a condition that results in distortion of transmitted light during use. Many plastics also scratch easily and are prone to yellowing or developing haze and birefringence; and the application of abrasive-resistant and anti-reflective coatings still has not fully solved these flaws for plastic materials. Finally, many chemical and environmental agents degrade plastics, which make them difficult to clean effectively.

In comparison to plastics, glass possesses properties that make them more suitable for use as an optical material. Glass normally does not suffer from the material shortcomings of plastics, and it can better withstand detrimental environmental or operational conditions. Hence, glass is a more preferred material, and glass optical components represent a different class of devices than those made from plastics. However, the requirements of the molding processes that use glass are more stringent than those for plastics.

Precision optical elements of glass are customarily produced by one of two complex, multi-step processes. In the first method a glass batch is melted at high temperatures and the melt is formed into a glass body or gob having a controlled and homogeneous refractive index. Thereafter, the glass body may be reformed using repressing techniques to yield a shape approximating the desired final article. The surface quality and finish of the body at this stage of production, however, are not adequate for image forming optics. As a result, the rough article is fine annealed to develop the proper refractive index and the surface features are improved by conventional grinding and polishing practices. In the second method the glass melt is formed into a bulk body, which is immediately fine annealed, cut and ground into articles of the desired configuration. Both of these methods have their limitations. Grinding and polishing are restricted to producing relatively simple shapes, for example, flats, spheres, and parabolas. Other shapes and general aspheric surfaces are difficult to grind and complicated to polish. On the other hand, conventional techniques for hot pressing of glass do not provide the exacting surface features and qualities that are required for clear image forming or transmission applications. The presence of chill wrinkles in the surface and surface features are unacceptable defects.

Glass molding has also traditionally presented a number of other problems. Generally, to mold glass one must use high temperatures, typically greater than about 700° C. or 800° C., so as to make the glass conform or flow into a requisite profile as defined by a mold. However, at such relatively high temperatures, glass becomes highly chemically reactive. Due to this reactivity, highly refractory molds with inert contact surfaces are required for molding glass: for example, molds of silicon carbide, silicon nitride, or other ceramic materials, intermetallic materials such as iron aluminides, and hard materials such as tungsten. However, in many cases such materials cannot attain sufficient surface smoothness for making satisfactory optical quality surface finishes. Precision optical elements require highly polished surfaces of exacting microstructure and quality. Metal molds can deform and recrystallize at high temperatures, both of which can adversely affect the surface and optical qualities of the article being molded. This means additional costs to repair and maintain the molds, and higher defect rates in the product. Second, also due to the reactivity of the glass at high temperatures, the molding often must be carried out in an inert atmosphere, which complicates the process and increases costs. Third, the potential for air or gas bubbles to be entrapped in the molded articles is another drawback of high-temperature molding. Gas bubbles trapped within glass articles degrade the optical properties of the articles. The bubbles distort images and generally disrupt optical transmission. Fourth, even at high temperatures, hot-glass molding cannot create intricate, high-frequency, submillimeter microstructures such as those required for diffraction gratings.

Molded glass articles have been described in the past. However, in previous processes, the molding is done by pressing (or compression molding) at ultra high viscosities in the range of $10^8$-$10^{12}$ poise. For example, an aspheric lens can be formed using these processes by pressing a glass gob in a mold at approximately $10^9$ poise. Molding is carried out at these ultra-high viscosities in order to prevent crystallization of the glass.

The injection molding process as practiced by the polymer industry is typically run at a maximum temperature of 400° C. Therefore, in order for a glass to be injection molded, it is necessary that it have a 10,000 poise temperature of 400° C. or less and that it be resistant to crystallization when subjected to high shear rates of 1,000 to 10,000 $sec^{-1}$ at its 10,000 poise temperature.

The use of chalcogenide glasses has been investigated for molding of glass elements having very fine surface features. However, these glasses typically contain arsenic. The inclusion of arsenic into the glass inhibits crystallization of chalcogenide glasses, which is necessary feature of hot-melt processing of chalcogenide glasses.

However, the use of arsenic has several disadvantages. During glass, production, manufacturers are exposed to arsenic, which is recognized as a human carcinogen (and has been implicated in lung cancer, skin cancers, stomach cancers, kidney and bladder cancers, and leukemia and lymphoma). Arsenic can also interfere with the production of adenosine triphosphate (ATP) in cells as well as increase the production of hydrogen peroxide, which in turn may lead to the production of reactive oxygen species and oxidative stress. Arsenic poisoning can ultimately result in death from the failure of multiple organs. Further, depending upon conditions of use, arsenic may leach from glass, creating an exposure hazard for users of optical devices manufactured from known chalcogenide glasses.

What is needed is an arsenic-free chalcogenide glass composition capable of being used in hot-melt processing techniques and equipment. Ideally, the composition would be stable against crystallization, transmissive to IR and near-IR radiation, and suitable for the fabrication of optical devices, including devices with fine or hyperfine microstructures.

SUMMARY

Disclosed herein are methods for producing glass articles by hot-melt processing techniques. Hot-melt processing techniques include injection molding, extrusion, transfer molding, profile extraction, and hot embossing. The methods involve the use of arsenic-free chalcogenide glasses. Despite the absence of arsenic, the chalcogenide glasses have low characteristic temperatures and are stable against crystallization. The low characteristic temperatures render the glasses capable of being hot-melt processed using conventional equipment. The glasses disclosed herein are suitable for the fabrication of optical devices, including but not limited to IR-transmitting optical devices.

The advantages of the materials, methods, and devices described herein will be set forth in part in the description that follows, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below.

DETAILED DESCRIPTION

Figure 1:
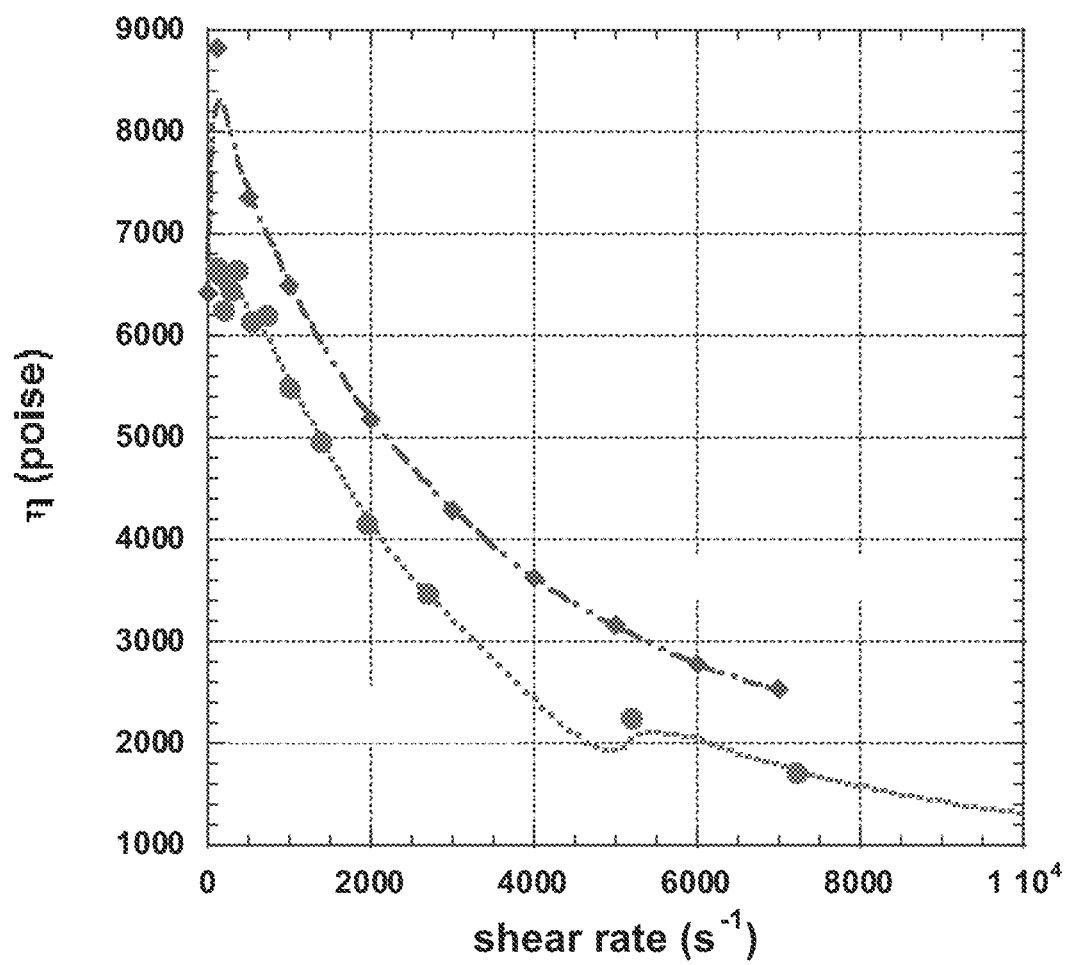
FIG. 1 shows the shear dependence of viscosity of an arsenic-containing chalcogenide glass at 300° C. (♦) and an arsenic-free chalcogenide glass at 350° C. described herein (●).

Before the present materials, articles, and/or methods are disclosed and described, it is to be understood that the aspects described below are not limited to specific compounds, synthetic methods, or uses, as such may, of course, vary. It is also to be understood that the terminology used herein is for the purpose of describing particular aspects only and is not intended to be limiting.

In the specification and in the claims that follow, reference will be made to a number of terms that shall be defined to have the following meanings:

It must be noted that, as used in the specification and the appended claims, the singular forms "a," "an," and "the" include plural referents unless the context clearly dictates otherwise. Thus, for example, reference to "an element" includes mixtures of two or more elements, and the like.

"Optional" or "optionally" means that the subsequently described event or circumstance can or cannot occur, and that the description includes instances where the event or circumstance occurs and instances where it does not. For example, the optical elements described herein may optionally contain hyperfine structures, where the hyperfine structure may or may not be present.

As used herein, the term "about" is used to provide flexibility to a numerical range endpoint by providing that a given value may be "a little above" or "a little below" the endpoint without affecting the desired result.

Throughout this specification, unless the context dictates otherwise, the word "comprise," or variations such as "comprises" or "comprising," will be understood to imply the inclusion of a stated integer or step or group of integers or steps but not the exclusion of any other integer or step or group of integers or steps.

As used herein, the term "chalcogenide glass" means a non-oxide glass that contains at least one of the Group VIA elements (e.g., sulfur, selenium, tellurium, or any combination thereof) and one or more metals. Chalcogenide glasses generally transmit electromagnetic radiation (light) in the 500-20,000 nm range of the infrared spectrum.

As used herein, the term "arsenic-free chalcogenide glass" means a chalcogenide glass that is produced without the addition of free, elemental arsenic or an arsenic chalcogenide such as $As_2Se_3$. It is possible that one or more elements used to produce the chalcogenide glass may contain arsenic as an impurity; however, this impurity is distinguished from the addition of free, elemental arsenic. In one aspect, the arsenic-free chalcogenide glass has less than or equal to 0.0025 atomic % arsenic. In another aspect, the arsenic-free chalcogenide glass has from 0.0001 atomic % to 0.0025 atomic % arsenic. In a further aspect, the arsenic-free chalcogenide glass has 0.0001 atomic %, 0.0005 atomic %, 0.0010 atomic %, 0.0015 atomic %, 0.0020 atomic %, or 0.0025 atomic % arsenic, where any value can provide a lower or upper end-point of a range (e.g., 0.0001 atomic % to 0.0010 atomic %, 0.0005 atomic % to 0.0015 atomic %, 0.0010 atomic % to 0.0025 atomic %, etc.).

As used herein, the term "hot-melt processing" is any process that involves applying heat and pressure to the arsenic-free chalcogenide glass to produce a glass article of interest. Examples of hot-melt processing techniques include injection molding, extrusion, transfer molding, profile extraction, or hot embossing.

As used herein, the "10,000 poise temperature" is a temperature at which glass has a viscosity of 10,000 poise and therefore is an approximate estimate of the temperature at which it can be worked. The specific temperature of any glass composition at which the viscosity of the glass is 10,000 poise can vary with the materials in the glass and can be determined using techniques known in the art. In one aspect, the glasses disclosed herein have 10,000 poise temperatures of 400° C. or less, which enables them to be injection molded using conventional equipment.

"Shear rate" refers to the rate at which a progressive shearing deformation is applied to a material. As used herein, a high shear rate refers to 1000-10,000 sec'. In one aspect, the compositions disclosed herein are resistant to crystallization when subjected to high shear rates.

"Crystallization" refers to the formation of crystals, or solid phases where the constituents of a material are arranged in a highly ordered microscopic structure. In one aspect, crystallization is undesirable in the materials and methods disclosed herein. In another aspect, the materials disclosed herein are resistant to crystallization during processing.

As used herein, the "glass transition temperature" ($T_g$) of a material characterizes the temperatures at which a glass transition occurs in an amorphous material. At temperatures below $T_g$, the material exists in a hard and brittle state and at temperatures above $T_g$, the material exists in a molten state. $T_g$ is always lower than the melting temperature of a material's crystalline state, if a crystal state exists for the material.

The "refractive index" of a material is a number that describes how light propagates through that material. It is defined by the equation n=c/v, where c is the speed of light in a vacuum and v is the speed of light as it propagates through the material. In one aspect, the refractive indices of the materials disclosed herein are relatively stable over a wide temperature range, or "isotropic."

"Infrared" (IR) radiation has a wavelength of from 800 nm to 1 mm. A material that possesses "IR transparency" allows photons with wavelengths in that range (or a portion of that range) to pass through.

References in the specification and concluding claims to atomic percentages of a particular element in a composition or article denote the molar relationship between the element or component and any other elements or components in the composition of the article for which an atomic percentage is expressed. Thus, in a compound containing 2 atomic percent of component X and 5 atomic percent of component Y, X and Y are present at a molar ratio of 2:5, and are present in such a ratio regardless of whether additional components are contained in the compound.

As used herein, a plurality of items, structural elements, compositional elements, and/or materials may be presented in a common list for convenience. However, these lists should be construed as though each member of the list is individually identified as a separate and unique member. Thus, no individual member of any such list should be construed as a de facto equivalent of any other member of the same list based solely on its presentation in a common group, without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range was explicitly recited. As an illustration, a numerical range of "about 1 to about 5" should be interpreted to include not only the explicitly recited values of about 1 to about 5, but also to include individual values and sub-ranges within the indicated range. Thus, included in this numerical range are individual values such as 2, 3, and 4, the sub ranges such as from 1-3, from 2-4, from 3-5, etc., as well as 1, 2, 3, 4, and 5 individually. The same principle applies to ranges reciting only one numerical value as a minimum or maximum. Furthermore, such an interpretation should apply regardless of the breadth of the range or the characteristics being described.

Disclosed are materials and components that can be used for, can be used in conjunction with, can be used in preparation for, or are products of the disclosed compositions and methods. These and other materials are disclosed herein, and it is understood that when combinations, subsets, interactions, groups, etc., of these materials are disclosed, that while specific reference to each various individual and collective combination and permutation of these compounds may not be explicitly disclosed, each is specifically contemplated and described herein. For example, if a glass composition is disclosed and discussed and a number of different optical elements are discussed, each and every combination of glass composition and optical element that is possible is specifically contemplated unless specifically indicated to the contrary. For example, if a class of glass compositions A, B, and C are disclosed, as well as a class of optical elements D, E, and F, and an example combination of A+D is disclosed, then even if each is not individually recited, each is individually and collectively contemplated. Thus, in this example, each of the combinations A+E, A+F, B+D, B+E, B+F, C+D, C+E, and C+F is specifically contemplated and should be considered from disclosure of A, B, and C; D, E, and F; and the example combination of A+D. Likewise, any subset or combination of these is also specifically contemplated and disclosed. Thus, for example, the sub-group of A+E, B+F, and C+E is specifically contemplated and should be considered from disclosure of A, B, and C; D, E, and F; and the example combination of A+D. This concept applies to all aspects of the disclosure including, but not limited to, steps in methods of making and using the disclosed compositions. Thus, if there are a variety of additional steps that can be performed with any specific embodiment or combination of embodiments of the disclosed methods, each such combination is specifically contemplated and should be considered disclosed.

Disclosed herein are methods for producing glass articles by hot-melt processing techniques. It has been unexpectedly discovered that the use of arsenic-free chalcogenide glasses can be used in hot-melt processing techniques. As will be demonstrated herein, the arsenic-free chalcogenide glasses have similar properties (e.g., shear thinning, non-crystallization) compared to chalcogenide glasses that contain arsenic. Further details are provided in the Examples below.

In one aspect, the arsenic-free chalcogenide glass has a viscosity of 10,000 poise or less at a temperature of 500° C. or less. In some aspects, the arsenic-free chalcogenide glass has a viscosity of 10,000 poise or less at a temperature of 450° C. or less, or at a temperature of 400° C. or less, or at a temperature of 375° C. or less, or at a temperature of 350° C. or less, or at a temperature of 325° C. or less, or at a temperature in the range from 250° C. to 500° C., or at a temperature in the range from 275° C. to 475° C., or at a temperature in the range from 300° C. to 450° C., or at a temperature in the range from 325° C. to 425° C., In yet another aspect, the chalcogenide glass is resistant to crystallization at shear rates in the range of 1,000 $sec^{-1}$ to 10,000 $sec^{-1}$.

In some aspects, the method includes hot-melt processing of an arsenic-free chalcogenide glass at a temperature of 500° C. or less, or at a temperature of 450° C. or less, or at a temperature of 400° C. or less, or at a temperature of 375° C. or less, or at a temperature of 350° C. or less, or at a temperature of 325° C. or less, or at a temperature in the range from 250° C. to 500° C., or at a temperature in the range from 275° C. to 475° C., or at a temperature in the range from 300° C. to 450° C., or at a temperature in the range from 325° C. to 425° C., In one aspect, the arsenic-free chalcogenide glasses disclosed herein can be made by mixing selected starting materials according to procedures known in the art. In a further aspect, the arsenic-free chalcogenide glasses can be made by melting the pure elements in quartz ampoules at melt temperatures in the range of approximately 600° C. to 1000° C. Further in this aspect, the arsenic-free chalcogenide glasses are quenched and the resulting glass material is broken into pieces, ground, and sieved to a selected size range suitable for use in an extruder or injection molder. In one aspect, the resulting material is powder or granules. In a still further aspect, fine and oversized particles can be recycled to subsequent preparations. In one aspect, typical particles sizes can be in the approximate range of 0.1 to 10 mm, or can be from 0.1-4 mm, or from 0.5 to 4 mm, or from 1 to 2 mm.

In another aspect, the resulting particles can be charged to an extruder. In one aspect, to prevent the extruder from having to carry the full heating load, the particles can be pre-heated to a temperature in the range of 50-100° C. below the operating temperature of the extruder. In a further aspect, as the material travels through the extruder, frictional heating and heat conducted into the barrel by heater bands can turn the glass from a solid to a viscous liquid that can be shaped in a die and collected by take-off equipment. In an alternative aspect, the extruder can feed the glass directly into an injection molding machine.

In one aspect, the arsenic-free chalcogenide glasses disclosed herein can be used in continuous screw-extrusion processes, as well as screw injection molding processes, such as, for example, those traditionally used for low-cost manufacturing of plastic articles.

In another aspect, particles of the arsenic-free chalcogenide glass can be charged to selected plastics processing equipment at a temperature sufficient for the glass to be a fluid having a viscosity of less than 10,000 poise at a temperature of less than 500° C.

In one aspect, the arsenic-free chalcogenide glasses disclosed herein can be injection molded by the "ram" process or the "screw" process. In the ram process, each stroke of the plunger pushes unmelted material into a heated cylinder, which in turn forces molten material at the front of the cylinder out through the nozzle and into the mold. In the screw process, unmelted granular material is conveyed forward, through a heated cylinder, by the rotation of an auger-type element. The material is converted to a viscous melt by the action of friction and heat conducted from the cylinder. Molten material, in front of the screw, is injected into the mold by a separate plunger/ram or by the screw itself. In one aspect, screw type injection molding machines are preferred to plunger type machines due to the superior mixing and process consistency of the screw process.

In one aspect, the injection molding process is typically run at a maximum temperature of 500° C., or, more preferably, at a maximum temperature of 400° C. Here, the arsenic-free chalcogenide glass has a 10,000 poise temperature of 400° C. or less and is resistant to crystallization when processed at high shear rates (such as, for example, in the range of 1,000-10,000 $sec^{-1}$) at their 10,000 poise temperatures.

In one aspect, the arsenic-free chalcogenide glass includes selenium and at least one element selected from phosphorus, gallium, antimony, tin, germanium, sulfur, or any combination thereof.

In one aspect, the arsenic-free chalcogenide glass includes selenium in the amount of from 40 atomic % to 85 atomic %, or is present in the amount of 40, 45, 50, 55, 60, 65, 70, 71, 72, 73, 74, 75, 76, 77, 78, 79, 80, 81, 82, 83, 84, or 85 atomic % of the arsenic-free chalcogenide glass, where any value can be a lower- or upper-end point of a range (e.g., 45 to 65, 72 to 82, 74 to 84, etc).

In another aspect, the amount of gallium is from 0 to 8 atomic % or is 1, 2, 3, 4, 5, 6, 7, or 8 atomic % of the arsenic-free chalcogenide glass, where any value can be a lower- or upper-end point of a range (e.g., 1 to 5, 2 to 6, etc). In an alternative aspect, the glass does not include gallium.

In one aspect, the amount of antimony is from 0 to 15 atomic % or is 1, 2, 3, 4, 5, 6, 7, 8, 9, 10, 11, 12, 13, 14 or 15 atomic % of the arsenic-free chalcogenide glass, where any value can be a lower- or upper-end point of a range (e.g., 2 to 10, 4 to 8, etc). In an alternative aspect, the glass does not include antimony.

In another aspect, the amount of tin is from 0 to 8 atomic % or is 1, 2, 3, 4, 5, 6, 7, or 8 atomic % of the arsenic-free chalcogenide glass, where any value can be a lower- or upper-end point of a range (e.g., 1 to 5, 2 to 6, etc). In an alternative aspect, the glass does not include tin.

In yet another aspect, the amount of germanium is from 0 to 20 atomic % or is 1, 2, 3, 4, 5, 6, 7, 8, 9, 10, 11, 12, 13, 14, 15, 16, 17, 18, 19, or 20 atomic % of the arsenic-free chalcogenide glass, where any value can be a lower- or upper-end point of a range (e.g., 10 to 20, 12 to 18, etc). In an alternative aspect, the glass does not include germanium.

In another aspect, the amount of sulfur is from 0 to 40 atomic % or is 1, 2, 3, 4, 5, 6, 7, 8, 9, 10, 15, 20, 25, 30, 35, or 40 atomic % of the arsenic-free chalcogenide glass, where any value can be a lower- or upper-end point of a range (e.g., 1 to 5, 2 to 6, 10 to 35, etc). In another aspect, the amount of sulfur present can be expressed by the ratio of S/(Se+S), where the amount of S and Se is atomic %. In one aspect, the ratio of S/(Se+S) is from 0 to 0.5. In another aspect, the ratio of S/(Se+S) is 0, 0.05, 0.1, 0.15, 0.2, 0.25, 0.3, 0.35, 0.4, 0.45, or 0.5, where any value can be a lower- or upper-end point of a range (e.g., 0.1 to 0.3, 0.2 to 0.4, etc).

In another aspect, the amount of phosphorus is from 0 to 25 atomic % or is 1, 2, 3, 4, 5, 6, 7, 8, 9, 10, 11, 12, 13, 14, 15, 16, 17, 18, 19, 20, 21, 22, 23, 24, or 25 atomic % of the arsenic-free chalcogenide glass, where any value can be a lower- or upper-end point of a range (e.g., 10 to 25, 15 to 20, etc). In an alternative aspect, the glass does not include phosphorus.

In still another aspect, the sum of atomic % of phosphorus, gallium, antimony, tin, and germanium is from 15 to 30 atomic % or is 15, 16, 17, 18, 19, 20, 21, 22, 23, 24, 25, 26, 27, 28, 29, or 30 atomic % of the arsenic-free chalcogenide glass, where any value can be a lower- or upper-end point of a range (e.g., 15 to 30, 20 to 25, etc).

In another aspect, the arsenic-free chalcogenide glass includes selenium in the amount of 70 atomic % to 85 atomic % and at least one element from the group phosphorus (P), gallium (Ga), antimony (Sb), tin (Sn), germanium (Ge), or any combination thereof, wherein P is from 0 atomic % to 25 atomic %; Ga is from 0 atomic % to 8 atomic %; Sb is from 0 atomic % to 10 atomic %; Sn is from 0 atomic % to 8 atomic %; and Ge is from 0 atomic % to 20 atomic %, wherein the sum of P, Ga, Sb, Sn, and Ge is from 15 atomic % to 30 atomic %.

The arsenic-free chalcogenide glasses disclosed herein are transmissive to infrared and near-infrared radiation. In one aspect, the arsenic-free chalcogenide glass has a transparency in the infrared to a wavelength up to 9 μm. In other aspects, when the arsenic-free chalcogenide glass does not include phosphorus, the arsenic-free chalcogenide glass has a transparency in the infrared to a wavelength up to 14 μm. Phosphorus is a light element relative to most of the other typical constituents of chalcogenide glass. Thus, the IR transparency of phosphorus-containing glasses is not as extensive as that of phosphorus-free glasses.

The arsenic-free chalcogenide glasses described herein can be used to produce a number of different glass articles such as, for example, optical elements and devices. The optical elements and devices produced from the arsenic-free chalcogenide glasses possess superior physical properties when compared to plastics. These properties can include, but are not limited to, being harder than plastic elements and thus being less likely to scratch; having a lower temperature dependence for their refractive indices; and being impermeable to moisture and gases.

In one aspect, the optical element can be a lens, a microlens, an array of microlenses, a prism, a coupler, a sensor, a diffraction grating, a surface relief diffuser, a fresnel lens, an optical fiber, or an optical device that incorporates multiple optical elements. In an alternative aspect, the optical element can be a fiber or other element that can be used to sense, transmit, multiplex, demultiplex, amplify, or otherwise manipulate and/or transmit light of selected wavelengths. In a further aspect, the optical element includes fine microstructures and/or hyperfine microstructures. In a still further aspect, these microstructures can be in the sub-micron range such as, for example, the rulings present on a grating.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. Numerous variations and combinations of reaction conditions (e.g., component concentrations, desired solvents, solvent mixtures, temperatures, pressures, and other reaction ranges and conditions) can be used to optimize the product purity and yield obtained from the described process. Only reasonable and routine experimentation will be required to optimize such process conditions.

Example 1: Method of Making Glass Compositions

By way of illustration and not to be construed as limiting, the arsenic-free chalcogenide glass sample 7 (Table 1 below) was prepared in the following manner, which is representative of the process disclosed herein. The equipment used in the following process is all commercially available.

A mixture, in atomic percent, of 15% Ge, 5% Sb, and 80% Se was mixed together in an amount sufficient to prepare a 500 gram glass boule and placed in a quartz ampoule that was evacuated (to $10^{-4}$ mm Hg or less) and sealed. The ampoule was heated to a temperature of approximately 800° C. for a time in the range of 30-36 hours, slow cooled to 600° C., and then rapidly cooled (quenched) by immersing the ampoule in a 4000 mL beaker of room temperature water until the arsenic-free chalcogenide glass delaminated from the ampoule wall. At this point, the ampoule was placed in an annealing furnace at an approximate temperature of 144° C. and held at this temperature for 1 hour. The furnace power was then turned off and the furnace was allowed to naturally cool to room temperature. The ampoule was then removed from the furnace and the arsenic-free chalcogenide glass removed from the ampoule.

Two boules of the arsenic-free chalcogenide glass were prepared as described and crushed to particles in the size range of minus −14 mesh plus 50 mesh (0.3 to 1.4 mm particle size). The particles were combined and the entire mass of 1000 grams was used in the following injection molding trial. The combined particles were analyzed and the glass was found to have the expected composition of $Ge_{15}Sb_5Se_{80}$.

Additional arsenic-free chalcogenide glasses were prepared using the procedure above. These are presented in Tables 1 and 2 below, along with selected properties of the compositions as discussed further in Example 3.

TABLE 1

Representative Glass Compositions and Properties

| Sample | 1 | 2 | 3 | 4 | 5 | 6 | 7 | 8 |
|---|---|---|---|---|---|---|---|---|
| Atom % | | | | | | | | |
| Ge | 0 | 5 | 5 | 5 | 0 | 5 | 15 | 15 |
| P | 16 | 20 | 17.5 | 15 | 12.5 | 15 | 0 | 0 |
| Ga | 0 | 0 | 0 | 5 | 4.17 | 0 | 0 | 0 |
| Sb | 4 | 0 | 2.5 | 0 | 8.33 | 5 | 5 | 0 |
| Sn | 0 | 0 | 0 | 0 | 0 | 0 | 0 | 5 |
| Se | 75 | 75 | 75 | 75 | 75 | 75 | 80 | 80 |
| S | 5 | 0 | 0 | 0 | 0 | 0 | 0 | 0 |
| Weight % | | | | | | | | |
| Ge | 0 | 5.26 | 5.09 | 5.11 | 0 | 4.94 | 13.6 | 13.6 |
| P | 7.01 | 8.97 | 7.6 | 6.55 | 5.08 | 6.31 | 0 | 0 |
| Ga | 0 | 0 | 0 | 4.91 | 3.82 | 0 | 0 | 0 |
| Sb | 6.87 | 0 | 4.27 | 0 | 13.33 | 8.27 | 7.6 | 0 |
| Sn | 0 | 0 | 0 | 0 | 0 | 0 | 0 | 7.42 |
| Se | 83.8 | 85.8 | 83 | 83.4 | 77.8 | 80.5 | 78.8 | 79 |
| S | 2.27 | 0 | 0 | 0 | 0 | 0 | 0 | 0 |
| Property | | | | | | | | |
| $T_g$ (° C.)[a] | 117 | 111 | 125 | 127 | 152 | 134 | 144 | 145 |
| 300/2 | | no xls | | | | | 223 | 258 |
| 325/2 | no xls[b] | no xls | no xls | no xls | no xls | | | |
| 350/2 | | no xls | no xls | no xls | no xls | no xls | no xls | no xls |
| 375/2 | | | | | | | no xls | no xls |

[a]Glass transition temperature
[b]"no xls" refers to lack of observed devitrification as measured by X-ray diffraction when powdered samples of the glass composition were heated at the cited temperature (° C.) for two hours

TABLE 2

Representative Glass Compositions and Properties

| Sample | 9 | 10 | 11 | 12 | 13 | 14 | 15 |
|---|---|---|---|---|---|---|---|
| Atom % | | | | | | | |
| Ge | 13 | 13 | 10 | 0 | 5 | 5 | 15 |
| P | 0 | 0 | 0 | 16 | 15 | 15 | 0 |
| Ga | 0 | 0 | 0 | 0 | 0 | 0 | 0 |
| Sb | 7 | 5 | 10 | 4 | 5 | 5 | 5 |
| Sn | 0 | 2 | 0 | 0 | 0 | 0 | 0 |
| Se | 80 | 80 | 80 | 70 | 65 | 55 | 70 |
| S | 0 | 0 | 0 | 10 | 10 | 20 | 10 |
| Weight % | | | | | | | |
| Ge | 11.6 | 11.7 | 8.79 | 0 | 5.27 | 5.66 | 14.44 |
| P | 0 | 0 | 0 | 7.26 | 6.74 | 7.24 | 0 |
| Ga | 0 | 0 | 0 | 0 | 0 | 0 | 0 |
| Sb | 10.5 | 7.51 | 14.7 | 7.13 | 8.84 | 9.48 | 8.07 |
| Sn | 0 | 2.93 | 0 | 0 | 0 | 0 | 0 |
| Se | 77.9 | 77.9 | 76.5 | 80.92 | 74.49 | 67.64 | 73.24 |
| S | 0 | 0 | 0 | 4.69 | 4.65 | 9.99 | 4.25 |
| Property | | | | | | | |
| $T_g$ (° C.)[a] | 129 | 136 | 121 | 118 | 130 | 125 | 127 |
| 300/2 | | | | | | | |
| 325/2 | | | | | | | |
| 350/2 | no xls | no xls | no xls | no xls | no xls | no xls | no xls |
| 375/2 | | | | | | | |

[a]Glass transition temperature
(b) "no xls" refers to lack of observed devitrification as measured by X-ray diffraction when powdered samples of the glass composition were heated at the cited temperature (° C.) for two hours

Example 2: Characterization of Properties

Shear dependence was measured by capillary rheometry. FIG. 1 illustrates the shear dependence of viscosity for an arsenic-containing glass (1.64 atomic % Ge; 28.36 atomic % As; 70 atomic % Se) at 300° C. and an arsenic-free chalcogenide glass (sample 7 in Table 1) at 350° C. The arsenic-free chalcogenide glass exhibits the shear thinning behavior characteristic of an extrudable and injection-moldable polymer material. In addition, there was no evidence for shear-induced crystallization of the arsenic-free glass, which would have been evidenced by an increase in viscosity at high shear rates (FIG. 1).

Figure 2:
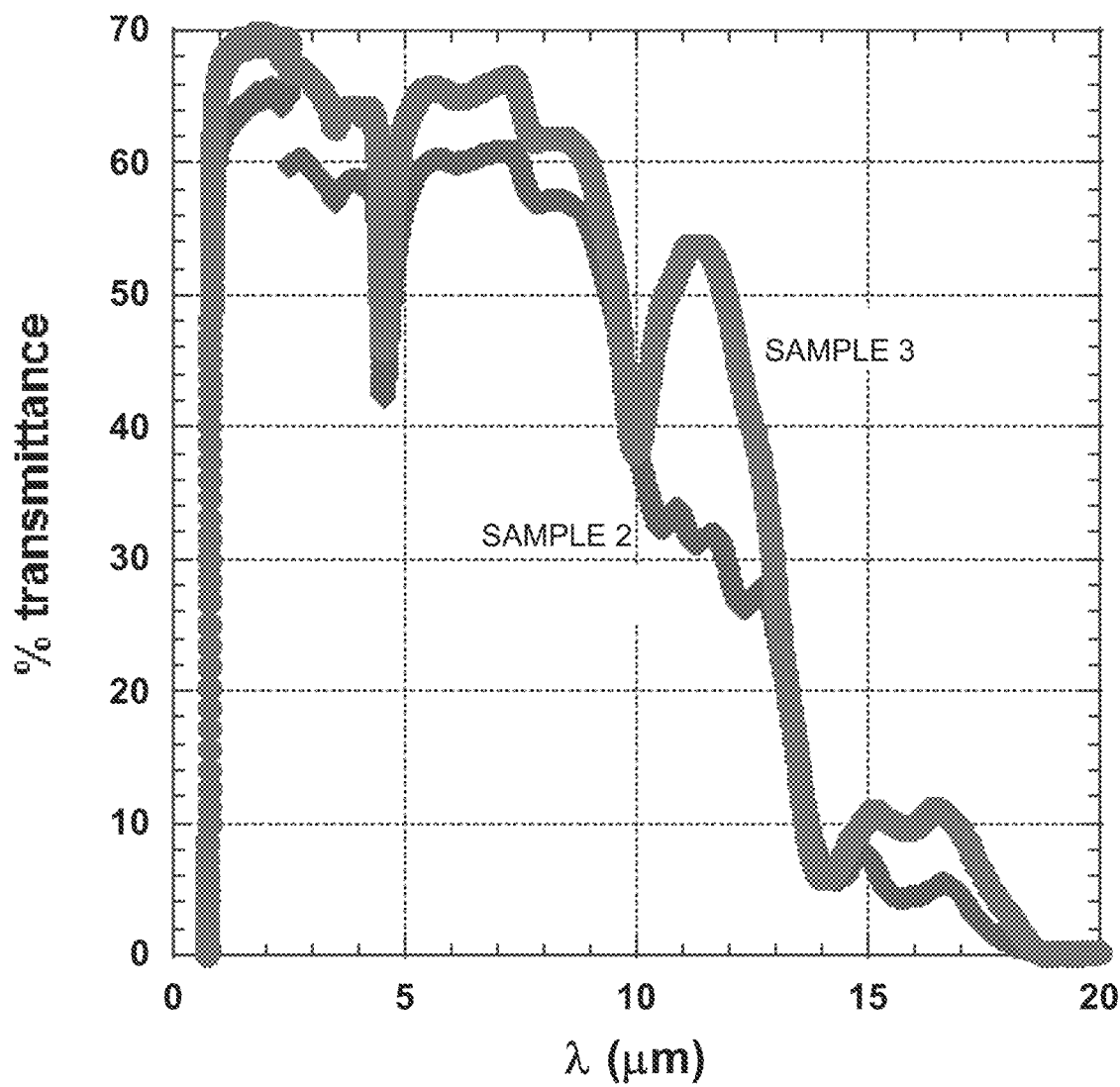
FIG. 2 is a graph of the transmittance of two phosphorus-containing arsenic-free chalcogenide glasses, showing transparency out to ~9 μm (absorption at ~4.55 μm is the Se—H stretch due to the presence of an H impurity).

Transmittance (expressed as % transmittance, uncorrected for reflection losses, for samples having a thickness of 2 mm) of two arsenic-free chalcogenide glasses (Sample 2 (lower data trace) and Sample 3 (upper data trace)) in the infrared and near-infrared regions was also evaluated and is displayed in FIG. 2. Although H impurities resulted in absorption at a wavelength of about 4.55 µm due to the Se—H stretch, the glasses were transparent to about 9 µm, rendering them suitable for a variety of optical applications in the infrared and near-IR wavelength ranges.

Figure 3:
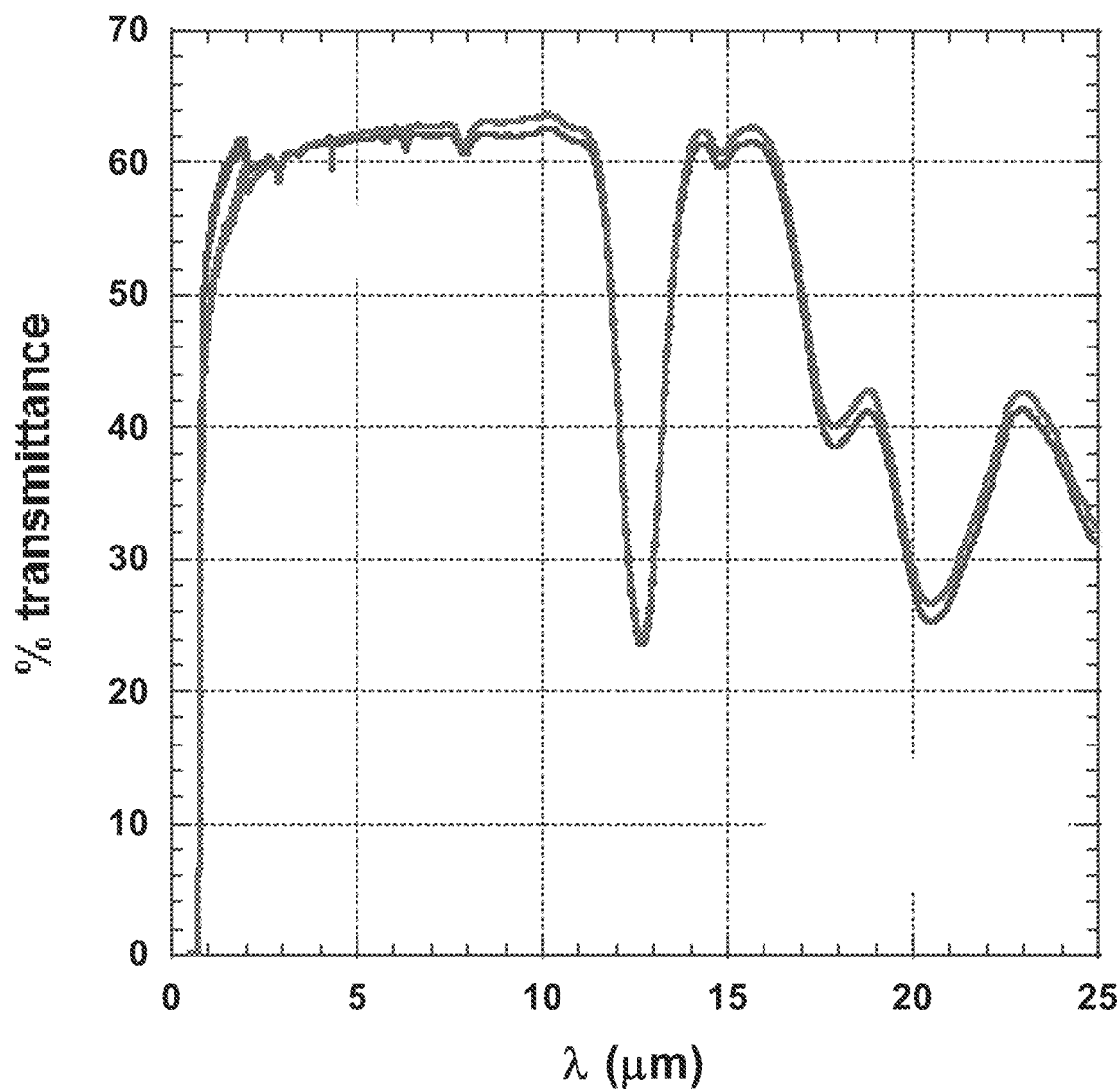
FIG. 3 is a graph of the transmittance of arsenic- and phosphorus-free chalcogenide glass lenses made by injection molding, showing transparency from 1 to ~16 μm (absorption at ~12.5 μm is due to an anionic impurity).

Lenses were constructed from sample 7 using injection molding and percent transmittance was measured. FIG. 3 shows the transparency (expressed as % transmittance for samples having a thickness of about 0.6 mm) of two representative lenses from 1 to 16 µm. (Absorption at 12.5 µm is due to an anionic impurity.)

Embodiments of the present arsenic-free glasses have a transparency (expressed as % transmittance, uncorrected for reflection losses, for samples having a thickness of 2 mm) at each wavelength in the range from 3 µm-6 µm of at least 30%, or at least 40%, or at least 50%, or at least 60%, or in the range from 30%-70%, or in the range from 35%-65%, or in the range from 40%-60%.

Embodiments of the present arsenic-free glasses have a transparency (expressed as % transmittance, uncorrected for reflection losses, for samples having a thickness of 2 mm) at each wavelength in the range from 6 µm-9 µm of at least 30%, or at least 40%, or at least 50%, or at least 60%, or in the range from 30%-70%, or in the range from 35%-65%, or in the range from 40%-60%.

Embodiments of the present arsenic-free glasses have a transparency (expressed as % transmittance, uncorrected for reflection losses, for samples having a thickness of 2 mm) at each wavelength in the range from 9 µm-11 µm of at least 30%, or at least 40%, or at least 50%, or at least 60%, or in the range from 30%-70%, or in the range from 35%-65%, or in the range from 40%-60%.

Embodiments of the present arsenic-free glasses have a transparency (expressed as % transmittance, uncorrected for reflection losses, for samples having a thickness of 2 mm) at a wavelength of 15 µm of at least 30%, or at least 40%, or at least 50%, or at least 60%, or in the range from 30%-70%, or in the range from 35%-65%, or in the range from 40%-60%.

Example 3: Preparation of Optical Devices from Arsenic-Free Chalcogenide Glasses A single-cavity, lens (12.9 mm diameter by 1 mm thick) mold was used to injection mold −14/+50 mesh particles of an arsenic-free chalcogenide glass (sample 7 of Table 1) on a Sodick Plustech LP20EH3 V-Line® Two-Stage Plunger Injection System. This machine is a micro molding machine with a maximum clamping force of 22 tons utilizing a 14 mm diameter screw, and uses a two-stage V-LINE method for plasticizing and injecting materials, which allows for consistent shot volumes and melt densities when compared with standard designs. Unlike conventional reciprocating screw systems, the V-LINE plasticizing screw remains stationary during material transfer, which minimizes axial wear and ensures a consistent heat profile. Once the exact amount of material is transferred into the injection chamber, the injection plunger is retracted via the melt pressure and is returned to a set position. This design eliminates the need for a check valve, which is a primary source of material degradation and shot volume inconsistency on conventional reciprocating screw systems.

Crushed glass was placed in the hopper/feeder and flood fed. The material process temperatures are listed in Table 3, where the various Zx positions of the injection molder are defined below and the temperature is controlled locally.

TABLE 3

| Barrel Temps (° C.) | | | | |
|---|---|---|---|---|
| ZJ | Z4 | Z5 | Z6 | Feed (ZH) |
| 340 | 330 | 320 | 310 | 34 |

| Plunger Temps (° C.) | | | Mold Temps (° C.) | |
|---|---|---|---|---|
| Z0 (Nozzle) | Z2 | ZP | A-Half | B-Half |
| 360 | 340 | 340 | 140 | 140 |

ZH: Feed zone
Z6: 1$^{st}$ heater band
Z5: 2$^{nd}$ heater band
Z4: 3$^{rd}$ heater band
ZJ: 90 degree coupler with heating blocks on each side
Z2 = Barrel sections before plunger
ZP = Backflow chamber
Z0 = Nozzle The material was injected into a single cavity lens mold. The mold housing was made from a series 7075 aluminum. A polished steel tab was inserted on the A-Half mold plate and a steel polished ejector pin was used in the B-Half Mold plate. The infrared transmittance of two representative lenses made by this process with the glass of example 7 was measured and its transparency in the 1 to 16 micron wavelength range is shown in FIG. 3.

Throughout this publication, various publications are referenced. The disclosures of these publications in their entireties are hereby incorporated by reference into this application in order to more fully describe the methods, compositions, and compounds herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed:

1. A method for producing a glass article, the method comprising continuous screw-fed extruding or continuous screw-fed injection molding an arsenic-free chalcogenide glass at a temperature less than 500° C. to produce the glass article.

2. The method of claim 1, wherein the arsenic-free chalcogenide glass has a viscosity of 10,000 poise or less at a temperature of 500° C. or less.

3. The method of claim 1, wherein the arsenic-free chalcogenide glass is resistant to crystallization at a shear rate in the range of 1,000 sec$^{-1}$ to 10,000 sec$^{-1}$.

4. The method of claim 1, wherein the arsenic-free chalcogenide glass comprises selenium (Se) in the amount of 40 atomic % to 85 atomic % and at least one element selected from the group consisting of phosphorus (P), gallium (Ga), antimony (Sb), tin (Sn), germanium (Ge), sulfur (S), or any combination thereof; wherein P is from 0 atomic % to 25 atomic %; Ga is from 0 atomic % to 8 atomic %; Sb is from 0 atomic % to 15 atomic %; Sn is from 0 atomic % to 8 atomic %; Ge is from 0 atomic % to 20 atomic %; and S is from 0 atomic % to 40 atomic % wherein the sum of P, Ga, Sb, Sn, and Ge is from 15 atomic % to 30 atomic %, and the atomic ratio of S/(Se +S) is from 0 to 0.5.

5. The method of claim 1, wherein the glass does not include phosphorus.

6. The method of claim 1, wherein the glass article has a transparency (expressed as % transmittance, uncorrected for reflection losses, for a thickness of 2 mm) at each wavelength in the range from 3 μm-6 μm of at least 50%.

7. The method of claim 1, wherein the glass article has a transparency (expressed as % transmittance, uncorrected for reflection losses, for a thickness of 2 mm) at each wavelength in the range from 3 μm-6 μm in the range from 30%-70%.

8. The method of claim 1, wherein the glass article has a transparency (expressed as % transmittance, uncorrected for reflection losses, for a thickness of 2 mm) at each wavelength in the range from 6 μm-9 μm of at least 50%.

9. The method of claim 1, wherein the glass article has a transparency (expressed as % transmittance, uncorrected for reflection losses, for a thickness of 2 mm) at each wavelength in the range from 6 μm-9 μm in the range from 30%-70%.

10. The method of claim 1, wherein the glass article has a transparency (expressed as % transmittance, uncorrected for reflection losses, for a thickness of 2 mm) at each wavelength in the range from 9 μm-11 μm of at least 50%.

11. The method of claim 1, wherein the glass article has a transparency (expressed as % transmittance, uncorrected for reflection losses, for a thickness of 2 mm) at each wavelength in the range from 9 μm-11 μm in the range from 30%-70%.

12. The method of claim 1, wherein the glass article comprises an optical element.

13. The method of claim 12, wherein the optical element is a lens, a microlens, an array of microlenses, a diffraction grating, a surface relief diffuser, a fresnel lens or an optical fiber.

14. The method of claim 12, wherein the optical element comprises fine or hyperfine microstructures.

15. The method of claim 1, wherein the arsenic-free chalcogenide glass is continuous screw-fed extruded or continuous screw-fed injection molded at a temperature less than 400° C.

16. The method of claim 1, wherein the arsenic-free chalcogenide glass comprises (i) selenium, (ii) germanium, and (iii) phosphorus.

17. The method of claim 1, wherein the arsenic-free chalcogenide glass comprises (i) selenium, (ii) germanium, and (iii) tin, gallium, or a combination thereof.

* * * * *

UNITED STATES PATENT AND TRADEMARK OFFICE
CERTIFICATE OF CORRECTION

PATENT NO. : 10,519,061 B2  
APPLICATION NO. : 15/643831  
DATED : December 31, 2019  
INVENTOR(S) : Bruce Gardiner Aitken et al.

It is certified that error appears in the above-identified patent and that said Letters Patent is hereby corrected as shown below:

In the Claims

In Column 15, Line 14, Claim 4, delete "from15" and insert -- from 15 --, therefor.

Signed and Sealed this  
Thirty-first Day of March, 2020

Andrei Iancu  
*Director of the United States Patent and Trademark Office*